United States Patent Office 3,195,991
Patented July 20, 1965

3,195,991
PRODUCTION OF COMPOSITE METAL STRIP SUITABLE FOR THE MANUFACTURE OF BEARINGS
Lionel Stern, Kew, Victoria, and Bernard Milton Hadaway, Highett, Victoria, Australia, assignors to Repco Limited, Melbourne, Victoria, Australia, a company of Victoria, Australia
No Drawing. Filed Oct. 10, 1961, Ser. No. 144,035
Claims priority, application Australia, Nov. 7, 1960, 66,296/60
9 Claims. (Cl. 29—197)

This invention relates to the manufacture of a composite strip comprising a layer of aluminium-tin alloy which has a steel backing. Such a strip is suitable especially, but not exclusively, for the fabrication of aluminium-tin shell type bearings.

Aluminium-tin shell type bearings may take one of three forms:

(1) Solid cast bearings in which the material is homogeneous throughout and which must be relatively thick walled to permit the necessary "nip" in their housings. Bearings of this type have a high coefficient of expansion and must therefore be fitted with relatively large clearances for which reason they tend to be noisy and unsuitable for use in private cars.

(2) Aluminium-tin bearings having a hard aluminium alloy backing. These bearings also have a high coefficient of expansion and they are only suitable for installation in aluminium alloy housings.

(3) Aluminium-tin steel backed bearings which may be installed in steel or cast iron housings and are suitable for the bulk of automotive applications.

The present invention provides a bearing material suitable for the fabrication of bearings of type (3) above, in which the aluminium-tin antifriction lining is bonded to and supported by a backing shell of steel through the medium of a tin-free aluminium layer. Several methods of producing bearing material for the fabrication of bearings of type (3) are known. The majority of these include a roll bonding step, prior to which the surfaces of the materials to be roll bonded are cleaned and roughened either chemically or by mechanical means such as wire brushing.

In one process the steel is first aluminised (British Patent No. 762,817) and a layer of aluminium-tin is then hot roll bonded to the aluminised surface. In this process the strength of the bond between the aluminium-tin and the aluminised steel deteriorates as the percentage of tin is increased. Also this process requires the exercise of care in the temperature to which the aluminium-tin is heated and the temperature of roll bonding.

In another process (British Patent No. 798,360) the aluminium-tin is first rolled out and work hardened to form a strip of approximately the same hardness as that of a similar strip of soft mild steel. The two strips are then roll bonded in one pass affecting a reduction of approximately 50%. In this process also the strength of the bond deteriorates as the percentage of tin is increased.

In yet another process (British Patent No. 749,529) a composite ingot produced by casting and having one layer of aluminium-tin and a contiguous layer of tin free aluminium is rolled out to strip form and this strip is then roll bonded to the steel through the tin free layer. In this process the preparation of the composite ingot is difficult of achievement in production; in particular it is difficult to obtain a consistently strong bond between the aluminium-tin and the tin free aluminium, and it is also difficult to obtain a properly controlled plane of demarcation between the aluminium-tin and the tin-free aluminium and to avoid diffusion of one alloy into the other.

It is the primary object of the invention to overcome the above mentioned disadvantages and it has been found that the strip produced in the process of this invention has excellent bond strength between the aluminium-tin and the tin-free aluminium and also between the tin-free aluminium and the steel. It has also been found that alloys of aluminium-tin with relatively high tin content may be used without loss of strength of bond, and that the plane of demarcation between the aluminium-tin and the tin free aluminium can be easily and precisely controlled.

The present invention provides a process for the production of a composite metal strip, which comprises roll bonding a strip of aluminium-tin alloy to a strip of tin-free or substantially tin-free aluminium or aluminium alloy by means of substantial thickness reduction in the first pass through the rolls, and roll bonding a tin-free or substantially tin-free face of the duplex-strip so formed to a steel strip by means of substantial thickness reduction in the first pass, each strip being suitably prepared prior to the roll-bonding step concerned at the surface at which bonding is to take place.

The composite strip produced by the above process and the shell type bearings which may be manufactured therefrom are also considered to fall within the scope of the present invention.

The foregoing and various other features of the process will now be described in order that the invention may be more fully appreciated.

An ingot of aluminium-tin alloy may be cast in any desired length by any suitable method such as centrifugally in a revolving cylinder, in a continuous manner on an endless belt or as an open chill casting.

A chill cast fine grained ingot has been found to have the best rolling properties.

It has been found possible to bond the aluminium-tin ingot to a strip of tin-free aluminium of similar length and width without the necessity of further treatment to the ingot other than a surface preparation. Accordingly the references herein to a "strip of aluminium-tin alloy" should be understood to include an ingot of the alloy in strip, that is relatively long and thin, form.

If necessary because of rolling mill capacity limitations, the aluminium-tin ingot may be reduced in thickness by rolling down with successive passes in a rolling mill before preparation for bonding to the tin-free aluminium strip.

The strips are next prepared by any suitable method such as wire brushing, to give a clean and suitable surface on each strip where bonding is to take place.

The two strips would usually be proportioned so that there is a substantial difference between the thickness of the tin-free aluminium strip and the aluminium tin strip and preferably so that the tin-free aluminium strip is thin in comparison with the aluminium-tin strip but this is not essential.

The two strips are presented to each other, the prepared surfaces being together, and are passed through a rolling mill so that a heavy reduction is effected in the first pass thus bonding the two strips.

It is desirable that the duplex strip so formed be further reduced by successive passes through a rolling mill, thus improving the bond between the aluminium-tin and the tin-free aluminium by virtue of the further extension of the bonded surfaces and the further breaking up of the aluminium oxide originally present at these surfaces when first bonded. At the same time the hardness of the duplex strip is increased.

The tin-free aluminium face of the duplex strip is next prepared and presented to the face of a soft steel strip which has also been suitably prepared. The duplex strip and the steel strip are then roll bonded together by passing through a rolling mill to again effect a heavy thickness reduction in the first pass. The composite material so formed may then be annealed to remove the work-hardening produced by rolling the aluminium, but the work hardening imparted to the steel remains and cannot be removed by heat treatment, for the high temperature required to anneal the steel would cause a deterioration of the bond with the aluminium. The final strip may then be fabricated into bearings.

It has been observed that much greater extension of the bonded surfaces is required to effect a good bond between layers of aluminium than between aluminium and steel. It thus follows that the majority of the rolling passes should be used to bond the layers of aluminium together, with the final rolling pass used to bond the resultant aluminium strip to the steel, so as to yield the maximum bond strength between the layers of aluminium and the minimum work hardening to the steel.

The superior nature of the bonds is illustrated by the fact that it has now been found possible to further reduce the thickness of the composite strip without rupture of any of the bonds or edge cracking.

To improve the rolling properties of the aluminium tin ingot, it may be annealed after casting. Also, stress relieving treatments may be applied at any intermediate stage of the process at temperatures not exceeding the melting point of tin. If this is done, and full annealing of the aluminium-tin is avoided at any intermediate stage, a fine grained material will be obtained in the final strip yielding maximum fatigue strength in the subsequently produced bearing.

If the ultimate in fatigue properties is not sought, fully annealing the aluminium-tin or the duplex aluminium-tin/tin free aluminium strip may be resorted to at any stage of the process. The intermediate annealing will reduce edge cracking during rolling and permit the use of a thicker aluminium-tin ingot to start with, but the fatigue strength of the resultant material may be somewhat lower than that of a material in the production of which such intermediate annealing was avoided.

All rolling and roll bonding operations are usually carried out at ambient temperature if adequate rolling mill capacity is available, but these operations may also be carried out at temperatures not exceeding 227° C.—the melting point of the aluminium-tin eutectic.

During annealing of the final triplex strip, it is found that tin "sweats" out of the exposed surface of the aluminium-tin alloy. In a batch process, triplex strips coming from the rolling mill are usually not annealed individually but are stacked one above the other or coiled and are later annealed, in the stacks or coils, according to the capacity of the annealing furnace. In a continuous process, the triplex strip is usually coiled as it leaves the mill and the strip is annealed in coil form.

In both cases above, the aluminium-tin face of the strip will be in close contact with the steel backing of the flat strip or turn of the coil above it and the tin-sweat may cause the several layers of composite strips to stick together or leave adherent lumps which must be removed from the strip surfaces before further processing.

In order to overcome this problem, it is possible to prevent tin-sweat from occurring by covering the aluminium-tin layer with a protective layer of tin-free aluminium. This is achieved during production of the duplex strip by roll bonding a tin-free aluminium strip either to both major surfaces of the aluminium-tin strip simultaneously in the first pass or to each major surface separately in independent passes.

The provision of this protective layer has the further advantage that it prevents or reduces loss of tin during any annealing stage or stages. It is not necessary that the protective layer have the same composition as the layer which will be used for bonding to the steel.

Furthermore the protective layer provides a more corrosion-resistant surface for the final composite strip, thus improving its resistance to deterioration during storage prior to fabrication into bearings. This protective layer is removed during the normal process of fabrication of bearings.

It will be appreciated by those skilled in the art that the inventive concept of this invention may be applied to the production of composite strips which have three or more aluminium containing layers of differing composition. For example, an aluminium-tin bearing of the trimetal type can be produced by bonding a relatively thin layer of very high tin aluminium-tin alloy (50% or more tin) to an intermediate layer of high fatigue strength aluminium-tin alloy (say, 20% tin), to a bonding layer of aluminium substantially free of tin, to the steel backing. Bearing strip for such a bearing may of course, also have the additional surface layer of tin free aluminium to prevent tin loss by sweating during the process of manufacture. In such a case, the finished strip would consist of five layers bonded together.

As another example of the application of this process, bearing material may be made for floating bearings or bushes and in such material the various aluminium-tin and aluminium bearing and bonding layers may be bonded to both sides of a steel strip.

If desired, the tin-free or substantially tin-free aluminium strip may be replaced by a strip of aluminium-tin alloy having a relatively low tin content. For example, the commercially available alloy containing 6-7% tin will give a reasonable bond.

The following illustration of the present process is given by way of example and not limitation:

EXAMPLE

An aluminium-tin ingot consisting of 30% tin, .7% copper, and the remainder aluminium was chill cast to a thickness of approximately ⅞". This ingot was then machined substantially flat and parallel and to removing casting imperfections to a thickness of approximately ¾". The ingot was next rolled down to a thickness of .3" and was then degreased and scratch brushed on one surface. A strip of commercially pure aluminium .060" thick of similar length and width as the aluminium-tin strip was also degreased and scratch brushed on one surface. The brushed surfaces of these two strips were then laid together and roll bonded by reducing to .160" in one pass. The resulting composite strip was subsequently further rolled down in a number of passes to a thickness of approximately .040" increasing the bond strength of the strip. The tin free surface of this composite strip was then scratch brushed. Then placing this surface against the scratch brushed surface of a soft steel strip of a thickness of approximately .1", the two were roll bonded to a thickness of .070" in one pass (steel layer approximately .050", aluminium containing layer approximately .020"). The final strip was then annealed at approximately 350° C. for half an hour. This yielded a material with good bond between all adjacent layers.

In the above example, it will be seen that the bonding surface between the tin free aluminium and the steel was extended to twice its original length and this resulted in an excellent bond between these surfaces. An adequate bond could have been obtained by extending this surface to only 1.7 times its original length.

Also in the above example, the bonding surface between the aluminium-tin and the tin free aluminium was extended to 18 times its original length $$\left(\frac{.3+.060''}{.020''}\right)$$

and this resulted in a good bond. However, a much better bond would have been achieved had this bonding surface received an extension of approximately 30 times, i.e. if the tin free layer had been bonded to the aluminium-tin at a thickness of .540" instead of at .3" but this of course would have needed greater rolling mill capacity as the initial percentage reduction must still be of the same order to cause the strips of aluminium to "stick."

It will also be noted that the aluminium-tin alloy exemplified above contained 0.7% of copper. It will be realized by those skilled in the art that this percentage may be varied as may be the proportions of tin and aluminium and that other alloying elements such as silicon may be added to improve the strength of either the aluminium-tin or the tin-free aluminium layer.

It is to be understood that various alterations, modifications and/or additions may be incorporated in the foregoing without departing from the ambit of the invention as defined in the appended claims.

Having now described our invention, what we claim as new and desire to secure by Letters Patent is:

1. A process for the production of a composite metal strip from a strip of aluminum-tin bearing alloy bonded to a steel strip through the intermediary of a bonding layer formed of one of a tin free aluminum strip and a strip having a relatively low tin content aluminum alloy; comprising the steps of adhering a strip of aluminum-tin alloy to said bonding layer by a heavy rolling reduction pass, subjecting the duplex strip so formed of the aluminum tin alloy and adhered bonding layer to additional rolling to improve the strength of the bond, and subsequently roll bonding the said duplex strip to a steel strip, all of said rolling and bonding operations being carried out at ambient temperatures.

2. A process as claimed in claim 1 wherein stress relieving treatments are appled to said duplex strip prior to roll bonding said strip to the steel strip.

3. A process as claimed in claim 1 wherein said duplex strip is annealed prior to roll bonding said strip to the 4. A process as claimed in claim 1 wherein the composite metal strip is heat treated to anneal the non-ferrous layers only.

5. A process as claimed in claim 1 wherein the composite metal strip is reduced in thickness by further rolling.

6. A process for the production of a composite metal strip from a strip of aluminum-tin bearing alloy bonded to a steel strip through the intermediary of a bonding layer formed of one of a tin free aluminum strip and a strip having a relatively low tin content aluminum alloy; comprising the steps of adhering a strip of aluminum-tin alloy to said bonding layer by a heavy rolling reduction pass, subjecting the duplex strip so formed of the aluminum tin alloy and adhered bonding layer to additional rolling to improve the strength of the bond, and subsequently roll bonding the said duplex strip to a steel strip, all of said rolling and bonding operations being carried out at temperatures below the eutectic melting point of said strip of aluminum-tin bearing alloy.

7. A process for the production of a composite metal strip from a strip of aluminum-tin bearing alloy bonded to a steel strip through the intermediary of a bonding layer formed of one of a tin free aluminum strip and a strip having a relatively low tin content aluminum alloy; comprising the steps of adhering a strip of aluminum-tin alloy to one face of said bonding layer by a heavy rolling reduction pass to form a duplex strip, roll bonding an additional strip of tin free aluminum to the opposite face of said bonding layer to form a triplex strip, subjecting said triplex strip to additional rolling to improve the strength of the bond, and subsequently roll bonding said triplex strip to a steel strip, all of said rolling and bonding operations being carried out at ambient temperatures.

8. The process of making a composite metal bearing strip comprising the steps of casting an aluminum-tin ingot in the proportions of approximately 30% tin, .7% copper and the remainder aluminum to a thickness of approximately ⅞ of an inch, machining said ingot to provide substantially flat and parallel walls and reduce the thickness to approximately ¾ of an inch, rolling said ingot down to a thickness to approximately 3/10 inch, degreasing said ingot and scratch brushing one surface, providing a similar strip of commercially pure aluminum approximately .060 inch thick in degreased condition and scratch brushed on one surface, laying the said brushed surfaces of the aluminum tin strip and the aluminum strip together and roll bonding said strips together in one pass to form a composite strip and reduce the thickness to approximately .160 inch, further reducing the thickness of said composite strip in a number of passes to approximately .040 inch, scratch brushing the tin free surface of the composite strip, placing the last named scratch brushed surface against a scratch brushed surface of a soft steel strip having a thickness of approximately 0.10 inch, roll bonding the composite strip and the soft steel strip to a thickness of approximately .070 inch in one pass, and annealing the resultant strip at approximately 350° C. for approximately one half hour, all of said rolling and bonding operations being carried out at temperatures below the eutectic melting point of said strip of aluminum-tin bearing alloy.

9. A composite material steel-backed bearing, comprising a bearing layer of aluminum-tin alloy bonded to an intermediate bonding layer of tin-free aluminum, and a steel backing layer bonded to said intermediate layer, the aluminum in the bearing layer being continuous with and adhered directly to the aluminum in the intermediate layer without the interposition of an oxide layer at the bond line between the bearing layer and the intermediate layer produced by the method of claim 1.

References Cited by the Examiner

UNITED STATES PATENTS 2,693,121  11/54  Dight _____ 29—497.5

FOREIGN PATENTS 722,552  1/55  Great Britain.

JOHN F. CAMPBELL, *Primary Examiner.*